(12) United States Patent
Eitel et al.

(10) Patent No.: US 7,921,648 B2
(45) Date of Patent: Apr. 12, 2011

(54) EXHAUST GAS TURBOCHARGER INTERNAL COMBUSTION ENGINE

(75) Inventors: Jochen Eitel, Bissengen (DE); Rainer Lutz, Steinheim (DE)

(73) Assignee: Behr GmbH & Co. KG, Stuttgart (DE)

( * ) Notice: Subject to any disclaimer, the term of this patent is extended or adjusted under 35 U.S.C. 154(b) by 616 days.

(21) Appl. No.: 11/815,327

(22) PCT Filed: Jan. 16, 2006

(86) PCT No.: PCT/EP2006/000319
§ 371 (c)(1),
(2), (4) Date: Aug. 14, 2007

(87) PCT Pub. No.: WO2006/087062
PCT Pub. Date: Aug. 24, 2006

(65) Prior Publication Data
US 2008/0190108 A1    Aug. 14, 2008

(30) Foreign Application Priority Data

Feb. 21, 2005  (DE) .......................... 10 2005 008 103

(51) Int. Cl.
| | |
|---|---|
| *F02B 33/44* | (2006.01) |
| *F02B 29/04* | (2006.01) |
| *F02B 33/00* | (2006.01) |
| *F02M 25/07* | (2006.01) |
| *F28F 3/08* | (2006.01) |
| *F28D 7/10* | (2006.01) |

(52) U.S. Cl. ................... 60/605.2; 60/599; 123/568.12; 123/563; 165/167; 165/140

(58) Field of Classification Search ................ 60/605.2, 60/599; 123/568.12, 563; 165/167, 140, 165/51, 122; F02M 25/07; F02B 29/04
See application file for complete search history.

(56) References Cited

U.S. PATENT DOCUMENTS 4,055,158 A * 10/1977 Marsee .................... 123/568.12
(Continued)

FOREIGN PATENT DOCUMENTS

DE    4240239 A1 *  6/1994
(Continued)

OTHER PUBLICATIONS

A Machine Translation of JP 09-088727 A, published on Mar. 31, 1997.*

*Primary Examiner* — Thai Ba Trieu
(74) *Attorney, Agent, or Firm* — Leydig, Voit & Mayer, Ltd.

(57) ABSTRACT

An exhaust gas turbocharger internal combustion engine is disclosed including at least one cylinder in a fuel-air mixture is pre-compressed by a compressor and compressed and burned. Exhaust gas is evacuated from the cylinder and released in a turbine, wherein part of the evacuated exhaust gas is recirculated before being released in the turbine, via a high-pressure recirculation system including an exhaust gas cooling device including at least two cooling circuits guided through heat exchanging blocks successively connected in the flow direction of the exhaust gas. The heat exchanging block arranged furthest downstream in the flow direction of the exhaust gas is vertically arranged such that exhaust gas passes through the block parallel to the working line, wherein a condensate collection and/or evacuation device is provided on the lower end of the block.

7 Claims, 2 Drawing Sheets

U.S. PATENT DOCUMENTS

| | | | | |
|---|---|---|---|---|
| 4,593,748 A | * | 6/1986 | Kramb | 165/51 |
| 4,893,481 A | * | 1/1990 | Sullivan | 62/291 |
| 5,607,010 A | | 3/1997 | Schönfeld et al. | 60/605.2 |
| 5,802,846 A | * | 9/1998 | Bailey | 60/605.2 |
| 5,927,075 A | * | 7/1999 | Khair | 60/605.2 |
| 6,145,498 A | * | 11/2000 | Packard et al. | 123/563 |
| 6,196,303 B1 | * | 3/2001 | Hepper | 165/122 |
| 6,216,458 B1 | * | 4/2001 | Alger et al. | 60/605.2 |
| 6,244,256 B1 | * | 6/2001 | Wall et al. | 123/568.12 |
| 6,301,887 B1 | | 10/2001 | Gorel et al. | 60/605.2 |
| 7,121,329 B2 | * | 10/2006 | Shields et al. | 165/149 |
| 7,131,263 B1 | * | 11/2006 | Styles | 123/568.12 |
| 7,172,014 B2 | * | 2/2007 | Heine | 165/140 |
| 7,251,937 B2 | * | 8/2007 | Appleton | 60/599 |
| 7,281,529 B2 | * | 10/2007 | Lew et al. | 60/605.2 |
| 7,380,540 B1 | * | 6/2008 | Duffy et al. | 123/435 |
| 7,451,749 B2 | * | 11/2008 | Kardos | 123/568.12 |
| 7,469,691 B2 | * | 12/2008 | Joergl et al. | 123/568.12 |
| 7,536,998 B2 | * | 5/2009 | Held et al. | 123/568.12 |
| 2001/0047861 A1 | * | 12/2001 | Maeda et al. | 165/167 |
| 2004/0050375 A1 | | 3/2004 | Arnold | 60/605.2 |
| 2005/0199229 A1 | | 9/2005 | Eitel et al. | 123/568.12 |
| 2007/0204619 A1 | * | 9/2007 | Pelz et al. | 60/605.2 |
| 2008/0229744 A1 | * | 9/2008 | Gronberg | 60/605.2 |
| 2008/0295501 A1 | * | 12/2008 | Gong et al. | 60/299 |
| 2009/0044789 A1 | * | 2/2009 | Eitel et al. | 123/568.12 |
| 2009/0159021 A1 | * | 6/2009 | Kardos | 123/41.12 |

FOREIGN PATENT DOCUMENTS

| | | |
|---|---|---|
| DE | 103 51 546 | 6/2004 |
| DE | 102004013206 A1 * | 10/2005 |
| EP | 0 346 803 | 12/1989 |
| JP | 07243354 A * | 9/1995 |
| JP | 07269417 | 10/1995 |
| JP | 9-88727 | 3/1997 |
| JP | 09280118 A * | 10/1997 |
| JP | 2000027715 A * | 1/2000 |
| JP | 2003-247460 | 9/2003 |
| JP | 2003-535264 | 11/2003 |
| JP | 2004-191036 | 7/2004 |

* cited by examiner

EXHAUST GAS TURBOCHARGER INTERNAL COMBUSTION ENGINE

BACKGROUND OF THE INVENTION

The invention relates to an exhaust gas turbocharger internal combustion engine with at least one cylinder, in which a pre-compressed fuel-air mixture is compressed and combusted, wherein the exhaust gas that is produced is discharged from the cylinder and expanded in a turbine. In a so-called high-pressure exhaust gas recirculation system, part of the exhaust gas discharged from the cylinder, before being expanded in the turbine, is recirculated via a high-pressure recirculation system, which can be equipped with an exhaust-gas cooling device. In a so-called low-pressure exhaust gas recirculation system, part of the exhaust gas discharged from the cylinder and expanded in the turbine is recirculated via a low-pressure recirculation system, which is equipped with an exhaust gas cooling device, and pre-compressed together with fresh air in the compressor and cooled in a supercharger intercooler, which comprises at least one cooling circuit guided through at least one heat transfer block.

The problem of the invention is to devise an exhaust gas turbocharger internal combustion engine with at least one cylinder, in which a fuel-air mixture is compressed and combusted, wherein the exhaust gas that is produced is discharged from the cylinder and expanded in a turbine, which is equipped with either a high-pressure or a low-pressure recirculation system, whereby the risk of corrosion is reduced.

BRIEF SUMMARY OF THE INVENTION

The problem is solved for an exhaust gas turbocharger internal combustion engine with at least one cylinder, in which a fuel-air mixture is compressed and combusted, wherein exhaust gas is produced, which is discharged from the cylinder and is expanded in a turbine, wherein part of the exhaust gas discharged from the cylinder is recirculated before or after it is expanded in the turbine via a high-pressure or a low-pressure recirculation system equipped with an exhaust gas cooling device, which comprises one or at least two cooling circuits, which are led through heat transfer blocks that are connected one behind the other in the flow direction of the exhaust gas, such that the heat transfer block arranged at the farthest downstream position in the flow direction of the exhaust gas is arranged vertically, so that exhaust gas flows through the heat transfer block parallel to the effective line of the force of gravity from above or from below, wherein, at the bottom end of the heat transfer block there is a condensate collector and/or discharge device. In some circumstances, an arrangement of the heat transfer block essentially parallel to the effective line of the force of gravity is also sufficient.

High-pressure recirculation is understood to be the recirculation of exhaust gas that has not yet been expanded in the turbine. The recirculated exhaust gas is combined with fresh air compressed in the compressor. Before being combined with the recirculated exhaust gas, the compressed fresh air is cooled in a supercharger intercooler. A low-temperature cooling circuit or cold air flows through the heat transfer block arranged in the farthest downstream position. Through the low-temperature cooling, in some circumstances, the recirculated exhaust gas is cooled sufficiently far enough to produce condensate. Through the arrangement and shape according to the invention for the heat transfer block arranged in the farthest downstream position, the collection of condensate in the interior of the heat transfer block, especially in a heat transfer matrix, can be prevented. In this way, the corrosive loading of the heat transfer block can be reduced. This allows, in turn, the use of more cost-effective materials for the production of the heat transfer block.

A preferred embodiment of the exhaust gas turbocharger internal combustion engine is characterized in that air is used as the coolant in the cooling circuit of the heat transfer block arranged at the farthest downstream position. Preferably surrounding air flows through or around the heat transfer block.

Another preferred embodiment of the exhaust gas turbocharger internal combustion engine is characterized in that a low-temperature coolant is used as the coolant in the cooling circuit of the heat transfer block arranged in the farthest downstream position. The low-temperature coolant preferably involves a conventional low-temperature coolant.

Another preferred embodiment of the exhaust gas turbocharger internal combustion engine is characterized in that the recirculated exhaust gas is cooled sufficiently in the heat transfer block arranged in the farthest downstream position to precipitate condensate.

For an exhaust gas turbocharger internal combustion engine with at least one cylinder, in which a fuel-air mixture is compressed and combusted, wherein exhaust gas is produced, which is discharged from the cylinder and which is expanded in a turbine, wherein part of the exhaust gas discharged from the cylinder and expanded in the turbine is recirculated via a low-pressure recirculation system, which is equipped with an exhaust gas cooling device, and pre-compressed together with fresh air in the compressor and is cooled in a supercharger intercooler, which comprises at least one cooling circuit, which is led through at least one heat transfer block, the previously specified problem is solved in that the heat transfer block is arranged vertically, so that exhaust gas with fresh air flows through the heat transfer block parallel to the effective line of the force of gravity from above or from below, wherein at the bottom end of the heat transfer block there is a condensate collection and/or discharge device. In some circumstances, an arrangement of the heat transfer block essentially parallel to the effective line of the force of gravity is also sufficient.

Low-pressure recirculation is understood to be the recirculation of exhaust gas that has already been expanded in the turbine. The recirculated exhaust gas is combined with fresh air. The exhaust gas combined with the fresh air is pre-compressed in the compressor and cooled in the supercharger intercooler. Through the arrangement and shape according to the invention for the heat transfer block, the collection of condensate in the interior of the heat transfer block, especially in a heat transfer matrix, can be prevented. In this way, the corrosive loading of the heat transfer block can be reduced. This allows, in turn, the use of more cost-effective materials for the production of the heat transfer block.

A preferred embodiment of the exhaust gas turbocharger internal combustion engine is characterized in that the recirculated exhaust gas pre-compressed together with fresh air in the compressor is cooled sufficiently in the heat transfer block to precipitate condensate. The cooling can also be performed in several stages, that is, in several cooling circuits, which are led through heat transfer blocks connected one after the other in the flow direction of the exhaust gas combined with fresh air.

A preferred embodiment of the exhaust gas turbocharger internal combustion engine is characterized in that air is used as coolant in the heat transfer block. Preferably surrounding air flows through or around the heat transfer block.

Another preferred embodiment of the exhaust gas turbocharger internal combustion engine is characterized in that exhaust gas flows through the heat transfer block in the direction of the force of gravity from above towards the bottom. This arrangement is also designated as a falling flow arrangement and has proven especially advantageous in the scope of the present invention.

As illustrated in FIGS. 1 and 2, another preferred embodiment of the exhaust gas turbocharger internal combustion engine is characterized in that the condensate collection and/or discharge device 29, 59 comprises a drain tray 29a, 59a for the condensate. The drain tray is preferably arranged in a bottom gas collecting box of the heat transfer block. Alternatively, the bottom gas collecting box can also be formed from a different material than the heat transfer matrix. In this case, the separate drain tray can be eliminated.

Another preferred embodiment of the exhaust gas turbocharger internal combustion engine is characterized in that the drain tray for the condensate is formed from stainless steel or plastic. In this way, the wear due to corrosion by the condensate can be reduced.

As illustrated in FIGS. 1 and 2, another preferred embodiment of the exhaust gas turbocharger internal combustion engine is characterized in that the condensate collection and/or discharge device 29, 59 comprises a condensate discharge opening 29b, 59b that is provided in the heat transfer block. Preferably, the condensate discharge opening is arranged at the lowest position of the condensate collection device.

BRIEF DESCRIPTION OF THE SEVERAL VIEWS OF THE DRAWINGS

Additional advantages, features, and details of the invention emerge from the following description, in which two embodiments are described in detail with reference to the drawing. In this way, the features mentioned in the claims and in the description are each essential for the invention individually or in any combination. Shown are:

DETAILED DESCRIPTION OF THE INVENTION

Figure 1:
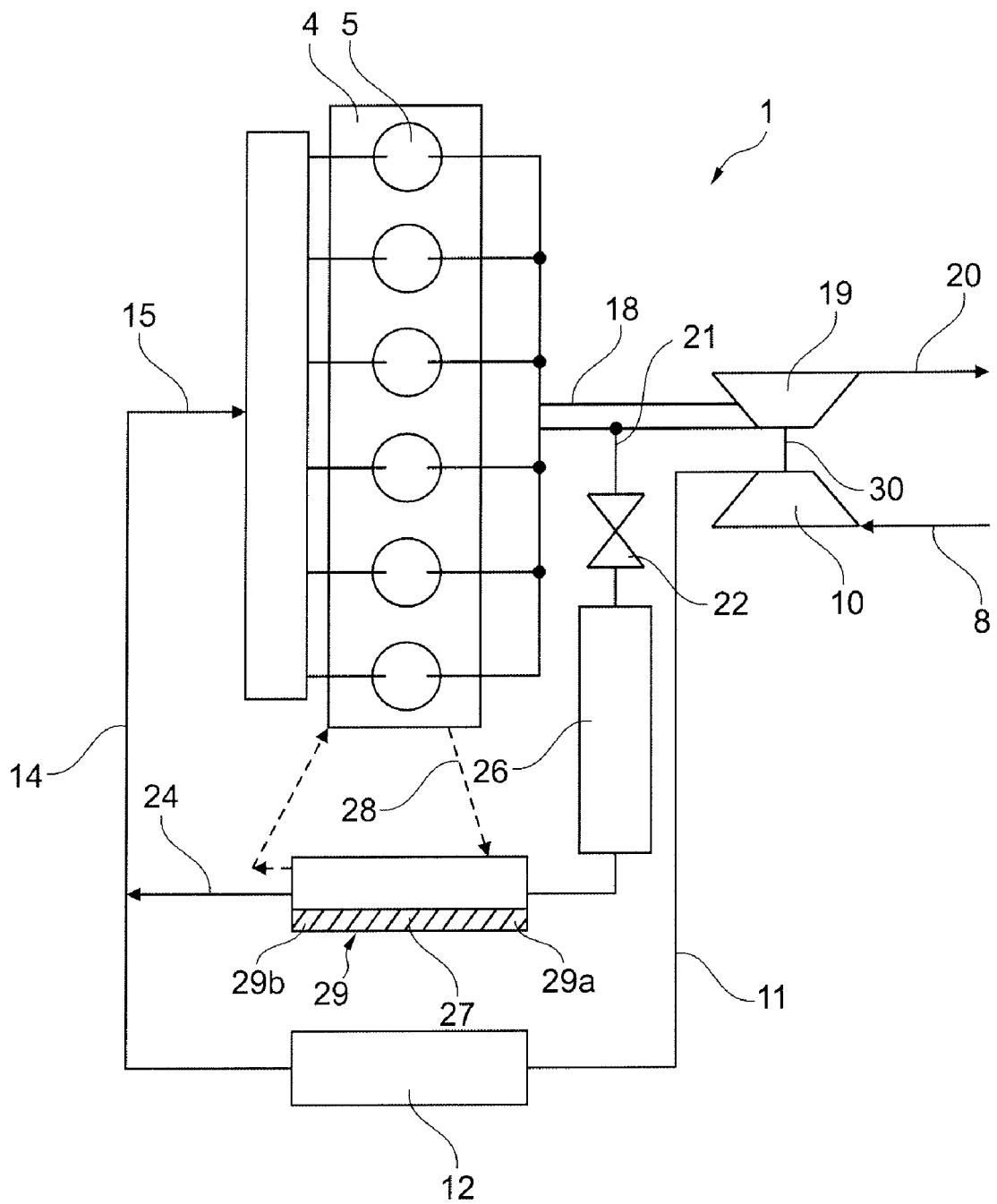
FIG. 1, a circuit diagram of an exhaust gas turbocharger internal combustion engine according to the invention with a high-pressure exhaust gas recirculation system and FIG. 2, a circuit diagram of an exhaust gas turbocharger internal combustion engine according to the invention with a low-pressure exhaust gas recirculation system.

In FIG. 1, a circuit diagram of an exhaust gas turbocharger internal combustion engine 1 is shown with a so-called high-pressure exhaust gas recirculation system. The exhaust gas turbocharger internal combustion engine 1 comprises a cylinder block 4 in which six pistons 5 are held so that they can move back and forth. An arrow 8 indicates that the exhaust gas turbocharger internal combustion engine 1 is supplied with fresh air from the surroundings. The fresh air is fed to a compressor 10, where it is compressed. The compressed fresh air is led via a line 11 into a supercharger intercooler 12, in which the compressed fresh air is cooled. The compressed and cooled fresh air is fed via a line 14 to the cylinder block 4, as indicated by an arrow 15.

In the cylinder block 4, the fresh air is combusted, and exhaust gas is produced. The exhaust gas is fed via an exhaust gas line 18 to a turbine 19, where it is expanded. An arrow 20 indicates that the exhaust gas expanded in the turbine 19 is output to the surrounding air. However, not the entire amount of exhaust gas is expanded in the turbine 19. At least one part of the exhaust gas is branched via a high-pressure recirculation line 21 from the exhaust-gas line 18 and recirculated via a valve 22 into the line 14, as indicated by an arrow 24. The recirculated exhaust gas is cooled in a first stage 26 and a second stage 27 of an exhaust gas cooling device. A connecting line 30 indicates that the compressor 10 is driven by the turbine 19.

For the high-pressure recirculation system, it is advantageous with respect to the emissions to cool the recirculated exhaust gas to as low a temperature as possible. For this purpose, the cooling is performed in two stages 26 and 27 in the exhaust gas turbocharger internal combustion engine 1 shown in FIG. 1. Basically, air, and low-temperature coolant 28 can be used as the coolant in the second stage 27. Very strong precipitation of condensate must be taken into account by the low-temperature cooling in the second stage 27. The condensate involves, for example, acids, but also, to a greater extent, water. Through the low-temperature cooling, it is possible to better utilize the potential of the exhaust gas recirculation system with respect to emissions and consumption than in one-stage systems. According to the present invention, the tubes of a heat transfer block of the second stage 27, which is also designated as the low-temperature stage, are arranged vertically, that is, parallel to the effective line of the force of gravity. Through this vertical arrangement, which is also designated as a vertical arrangement, the collection of condensate in the heat transfer matrix of the heat transfer block can be prevented. In this way, the corrosive loading of the cooler is reduced and thus the use of more favorable materials, possibly even aluminum, is allowed.

The heat transfer block can involve, for example, a round-tube cooler or a heat exchanger similar to the tube bundle of a round tube heat exchanger of steel, a copper-zinc alloy, or also an aluminum alloy. The heat transfer block can also be produced from aluminum elements in a stacked construction.

Preferably, exhaust gas flows through the heat transfer block of the second stage 27 from top to bottom. To prevent damage to air receivers at the cooler inlet and outlet, it is advantageous to capture the condensate in a special container and to discharge it from the cooler. The container can be either an insert of plastic, as illustrated in FIG. 1, or stainless steel or also a specially coated gas receiver. As an alternative to this configuration, the gas receiver can also be produced from a material that is different than the heat transfer matrix.

Figure 2:
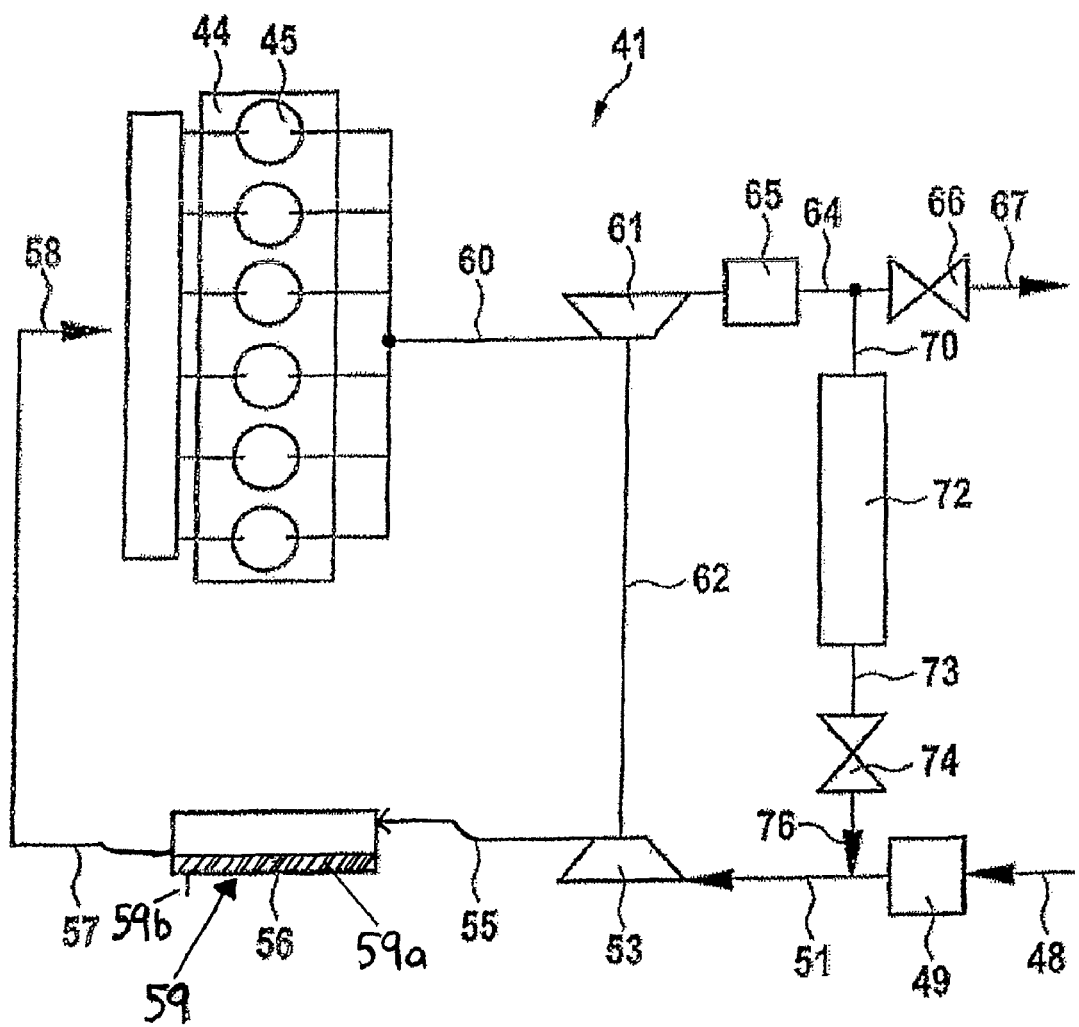

In FIG. 2, an exhaust gas turbocharger internal combustion engine 41 is shown with a so-called low-pressure exhaust gas recirculation system with reference to the circuit diagram. The exhaust gas turbocharger internal combustion engine 41 comprises a cylinder block 44, which holds six pistons 45 so that they can move back and forth. An arrow 48 indicates that fresh air is fed to the exhaust gas turbocharger internal combustion engine 41. The supplied fresh air is led via an air filter 49 and a line 51 to a compressor 53, in which the fresh air is compressed. The compressed fresh air is guided via a line 55 to a supercharger intercooler 56, where it is cooled. The cooled, compressed fresh air is fed via a line 57 to the cylinder block 44, as indicated by an arrow 58.

In the cylinder block 44, the fresh air supplied via the line 57 is combusted in a fuel-air mixture, and exhaust gas is produced. The exhaust gas is supplied via an exhaust gas line 60 to a turbine 61, where the exhaust gas is expanded. A connection line 62 indicates that the turbine 61 is used for driving the compressor 53.

The exhaust gas expanded in the turbine 61 is led via a line 64, in which a particle filter 65 is arranged, to a throttle valve 66. As a function of the position of the throttle valve 66, a portion of the exhaust gas is discharged to the surroundings, as indicated by an arrow 67. Another part of the exhaust gas is supplied via a low-pressure exhaust gas recirculation line 70 to an exhaust gas cooler 72. In the exhaust gas cooler 72, the recirculated exhaust gas is cooled. The cooled, recirculated exhaust gas is mixed or combined with the fresh air suctioned through the filter 49 in the line 51 via a line 73, in which a valve 74 is arranged, as indicated by an arrow 76. The mixture of exhaust gas and fresh air is compressed in the compressor 53, cooled in the supercharger intercooler 56, and supplied to the cylinder block 44.

The supercharger intercooler 56 is constructed according to the present invention as a down draft cooler, that is, the mixture of fresh air and exhaust gas, which is also designated as charge air, flows through the supercharger intercooler 56 from top to bottom. The condensate generated during cooling is discharged in the flow direction from the cooler and captured in discharge receivers 59 in a suitable stainless steel tray or, as illustrated in FIG. 2, a plastic tray 59*a*. Through the reduced accumulation in the cooler matrix or the reduced stay of the condensate in the cooler matrix, the corrosive loading of the component is reduced. Therefore, a longer service life is produced.

The invention claimed is:

1. An exhaust gas turbocharger internal combustion engine comprising:
   at least one cylinder, in which a pre-compressed fuel-air mixture is compressed and combusted, wherein exhaust gas is produced, which is discharged from the cylinder and expanded, wherein a part of the exhaust gas discharged from the cylinder is recirculated, before the exhaust gas is expanded,
   a high-pressure recirculation system comprising:
      a compressor,
      a turbine, and
      an exhaust gas cooling device,
      wherein the exhaust gas cooling device comprises:
         at least one cooling circuit comprising a first heat transfer block and a second heat transfer block, the first heat transfer and second heat transfer blocks being connected one after the other in the flow direction of the exhaust gas,
            wherein the second heat transfer block has a top end and a bottom end;
            wherein the second heat transfer block is arranged at the farthest possible downstream position in a flow direction of the exhaust gas and is arranged vertically so that exhaust gas flows through the second heat transfer block parallel or essentially parallel to an effective line of the force of gravity from the bottom end to the top end or from the top end to the bottom end, and recirculated exhaust gas flowing through the second heat transfer block precipitates condensate in the second heat transfer block; and
            wherein a condensate collection and/or discharge device is provided at the bottom end of the second heat transfer block.

2. The exhaust gas turbocharger internal combustion engine according to claim 1, wherein air is a coolant in the cooling circuit including the second heat transfer block arranged at the farthest downstream position.

3. The exhaust gas turbocharger internal combustion engine according to claim 1, wherein a low-temperature coolant is used as a coolant in the cooling circuit including the second heat transfer block arranged at the farthest downstream position.

4. The exhaust gas turbocharger internal combustion engine according to claim 1, wherein the exhaust gas flows through the second heat transfer block in a direction of the force of gravity from the top end to the bottom end of the second heat transfer block.

5. The exhaust gas turbocharger internal combustion engine according to claim 1, wherein the condensate collection and/or discharge device comprises a drain tray for the condensate.

6. The exhaust gas turbocharger internal combustion engine according to claim 5, wherein the drain tray for the condensate is formed from stainless steel or plastic.

7. The exhaust gas turbocharger internal combustion engine according to claim 1, wherein the condensate collection and/or discharge device comprises a condensate discharge opening, which is provided in the second heat transfer block.

* * * * *